(12) United States Patent
Emmett et al.

(10) Patent No.: US 7,689,046 B2
(45) Date of Patent: Mar. 30, 2010

(54) HYBRID IMAGE AND MOVIE IMAGING SYSTEM AND METHOD

(75) Inventors: Phillip J. Emmett, Rochester, NY (US); James Edwin Bollman, Williamson, NY (US)

(73) Assignee: Xerox Corporation, Norwalk, CT (US)

( * ) Notice: Subject to any disclaimer, the term of this patent is extended or adjusted under 35 U.S.C. 154(b) by 1107 days.

(21) Appl. No.: 11/334,542

(22) Filed: Jan. 19, 2006

(65) Prior Publication Data

US 2007/0165954 A1    Jul. 19, 2007

(51) Int. Cl.
 G06K 9/36    (2006.01)
(52) U.S. Cl. .................. 382/232; 382/305; 382/100
(58) Field of Classification Search .............. 382/232, 382/305, 100; 386/4; 380/269; 348/461, 348/571, E5.004, E7.056; 345/505; 709/217; 713/100

See application file for complete search history.

(56) References Cited

U.S. PATENT DOCUMENTS 6,154,600 A * 11/2000 Newman et al. ............... 386/4
6,985,589 B2 * 1/2006 Morley et al. ............... 380/269

* cited by examiner

Primary Examiner—Anh Hong Do
(74) Attorney, Agent, or Firm—Pillsbury Winthrop Shaw Pittman LLP

(57) ABSTRACT

The present application relates to a method and system for storing higher resolution images during capture and storage of a movie comprising lower resolution images.

20 Claims, 3 Drawing Sheets

HYBRID IMAGE AND MOVIE IMAGING SYSTEM AND METHOD

FIELD

The present application relates to a method and system for storing higher resolution images during capture and storage of a movie comprising lower resolution images.

BACKGROUND

Digital cameras that capture still images and digital cameras that capture movies are well-known in the art. Also, digital cameras that are capable of capturing both still images and movies are also well-known. Typically, these digital cameras with both capabilities require the user to switch from movie capture mode to still image capture mode to capture a still image while filming a movie. This is undesirable because the movie is interrupted while the user makes this manual switch of modes (and makes the switch back to resume the movie).

A prior art camera exists that allows the user to capture a still image while in movie capture mode. This camera is sold by Canon as Model S2 IS. However, when the user decides to depress the button for capturing the still image, the camera automatically deactivates the movie capture and switches over to the still image capture mode to capture the still image. This takes approximately 1 second, but it is still a second of lost movie filming. The Sony Cyber-shot DSC-M1 has a similar function with the same loss of movie frames.

SUMMARY

One aspect of the present application provides a method for storing higher resolution images during capture and storage of a movie comprising lower resolution images. The method comprises:

capturing a series of images in succession with an imaging device wherein each image is captured as digital data, continuously storing the digital data of the images in order in a FIFO buffer adapted to store a number of said images;

continuously compressing the digital data of each image exiting the buffer; and continuously storing the compressed digital data for each image in a memory system to enable the compressed digital data to be retrieved for playback of the images in a movie format; and upon the occurrence of a predetermined condition, copying the digital data of the images in the buffer to the memory system separate from the compressed data to enable the digital data of the images copied from the buffer to be retrieved.

Another aspect of the present application provides a system for storing higher resolution images during capture and storage of a movie comprising lower resolution images. The system comprises:

an imaging device operable to capture a series of images in succession wherein each image is captured as digital data, a FIFO buffer coupled to the imaging device for continuously storing the digital data of the images;

a compressor coupled to the FIFO buffer, the compressor being operable to continuously compress the digital data of each image exiting the buffer; and a memory system coupled to the compressor, the memory system being adapted to continuously store the compressed digital data for each image to enable the compressed digital data to be retrieved for playback of the images in a movie format;

wherein the FIFO buffer is also coupled to the memory system to enable, upon the occurrence of a predetermined condition, copying of the digital data of the images in the buffer to the memory system separate from the compressed data, thus allowing the digital data of the images copied from the buffer to be retrieved.

Other objects, features, and advantages of the present invention will become apparent from the foregoing detailed description, the accompanying drawings, and the appended claims.

DETAILED DESCRIPTION OF THE ILLUSTRATED EMBODIMENT(S)

The illustrated embodiments relate generally to a system and method for storing higher resolution images during capture and storage of a movie comprising lower resolution images. That is, the system may be generically considered a digital movie camera that allows the user to film a movie comprised of a series of digital images that have been compressed to a certain degree. However, the system also provides the user with the capability to capture and store selected images of a higher resolution prior to their final compression, thus allowing for those separately captured higher resolution images to be retrieved and used as desired. For example, the user may opt to select a desirable image from the stored higher resolution images, and use the same to create a higher quality photograph. Or the user may wish to save the "scene" (i.e., the portion of the movie comprised of the sequence of those higher resolution images) in the higher resolution format for any of a wide range of reasons.

A non-limiting advantage of such a system is that the image comprising the full movie are compressed to a higher degree (and are of lower resolution), and thus take up less memory—yet the higher resolution images can be stored at the user's option and are more suitable for use as still images as photographs or the like. Specifically, by using a higher level of compression for the images comprising the movie, this may save memory costs and/or allow the more images (and hence a longer movie) to be stored in a given size memory. However, the captured images of the higher resolution are better suited for use in still images. This is because in still images the lack of motion make resolution more important to the image quality. In contrast, with a movie, the images are moving, and resolution is somewhat less of a concern.

Figure 1:
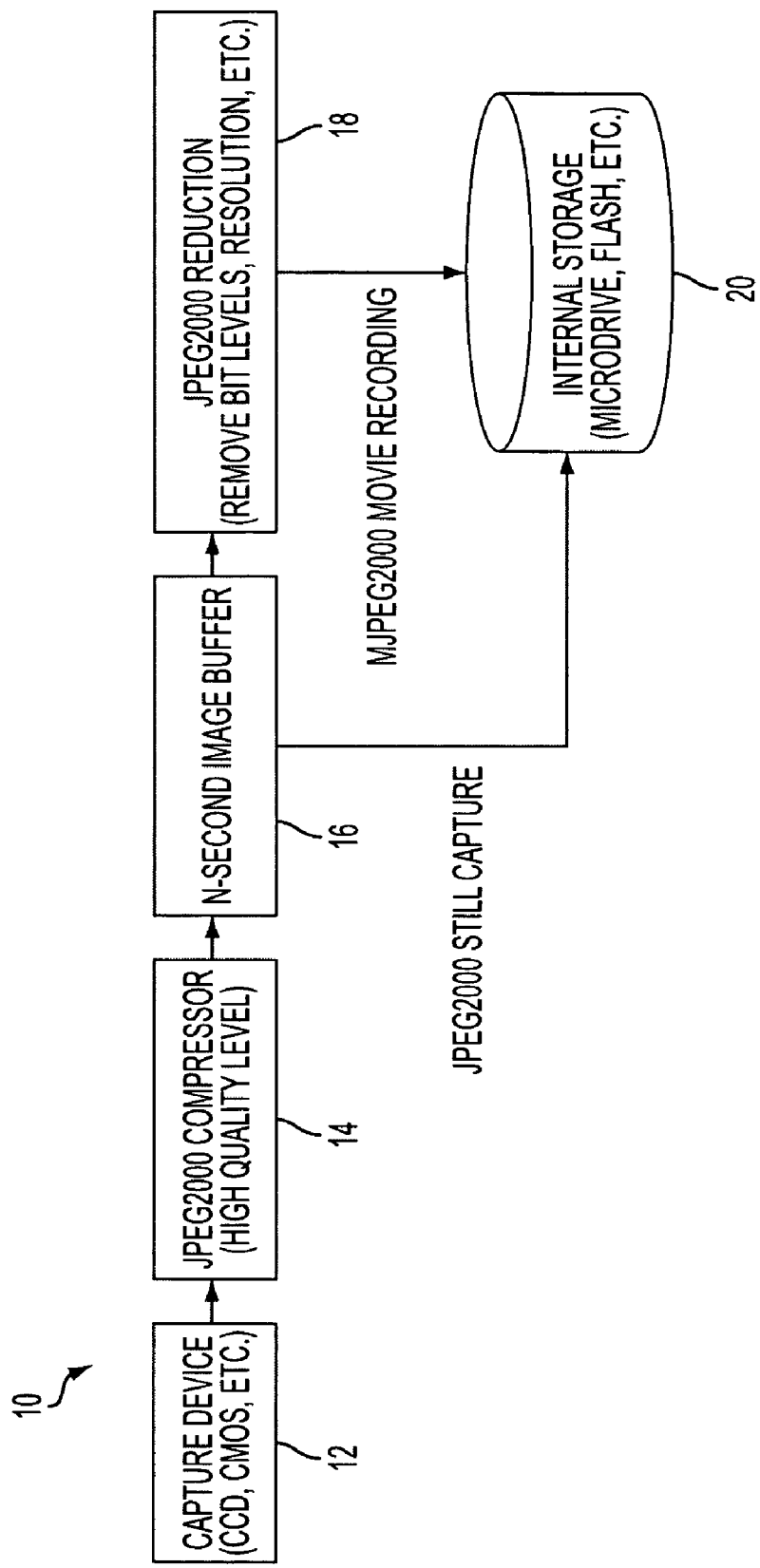
FIG. 1 is a schematic view of an embodiment of an image capture system.

FIG. 1 shows a schematic block diagram of an illustrated embodiment of such a system. The overall system is generally indicated 10. The system comprises an imaging device 12 operable to capture a series of images in succession wherein each image is captured as digital data. Such imaging devices are generally well-known and receive light reflected from the subject matter being imaged, and that light is converted into binary digital data. Examples of suitable imaging devices are CCD or CMOS imaging devices having a two dimensional array of light receiving elements that convert the received light into digital data. These examples are not intended to be limiting, and any suitable imaging device now known or later developed may be used.

The imaging device 10 has an output coupled to an input of an initial compressor 14. The initial compressor 14 in turn has an output coupled to the input of a FIFO (First In First Out) buffer 16. The initial compressor 14 is operable to initially compress the digital data of each image prior to storage in the buffer 16.

The FIFO buffer 16 continuously stores the initially compressed digital data of the images. Specifically, the buffer 16 is capable of storing a number of images, and specifically the digital data of those images. As each new image is stored to the input of the buffer 16 (also referred to as the head of the buffer 16), the images stored in the buffer 16 are advanced towards the output (also referred to as the tail) of the buffer 16. The oldest image stored in the buffer 16 is pushed out its output or tail, for further processing which will be discussed below. The term FIFO means First In First Out and is derived from the fact that the first image stored to the head of the buffer 16 will be the first image output by the tail in normal operation, and these images sequentially advance through the buffer 16 as each new image is captured and stored to the buffer head. Such buffers for handling image data are well-known and need not be detailed. Any suitable buffer now known or later developed may be used for this purpose.

The system 10 comprises a further compressor 18 with an input coupled to the output or tail of the FIFO buffer 16. The further compressor 18 is operable to continuously further compress the digital data of each image exiting the buffer 16.

As will be discussed below, the initially compressed (i.e., higher resolution) images in the FIFO buffer 16 can be saved to a memory for use as higher resolution still images (or selected higher resolution short movie scene), and the further compressed (i.e., lower resolution) images are saved in movie format for playback. Preferably, but not necessarily, the initially compressed images are compressed using a reversible compression process. That is, the compressed image data can be fully decompressed to restore the full or raw image data as it was originally captured. Thus, the full data of the raw image can be restored at the bit level. This is advantageous because it allows the initially compressed images to have the fullest possible resolution when retrieved, yet saves memory space by the compression. With respect to the further compressed performed on the images after exiting the FIFO buffer 16, they may be further compressed using a compression that is not fully reversible. Such a compression saves a great deal of memory space, but results in a loss of some data at the bit level. For example, in such a process, the compression may take adjacent bits of similar, but slightly different, color and make them the same for purpose of saving data space in storage. An example is the color blue in the sky—many of the bits in certain sections of the sky may be captured as slightly different shades of blue which are imperceptible to the eye on the bit level, and the compression may lump these bits together as one color so that they can be saved together as a compressed piece of data. The individual bit level data cannot be retrieved, but the memory space savings are more significant. Such processes and algorithms for both the initial and further compression processes are well-known in the art, and need not be detailed herein. For example, compression may be performed in accordance with a JPEG standard, such as JPEG 2000. Any suitable compression processes or combinations thereof may be used.

A memory system 20 is coupled to the output of the further compressor 18. The memory system 20 is adapted to continuously store the further compressed digital data for each image. This enables the further compressed digital data to be retrieved for playback of the images in a movie format. The manner in which such image data is stored is well know in the art, and need not be described herein in detail.

In the context of this application, the term movie or movie format is referring to the well-known manner in which movies are comprised of a series of still images played in rapid succession to re-create the motion of the objects in the played images. Likewise, the term continuously is used to reflect the rapid and sequential progression in which images are captured, advanced through the buffer, compressed, and stored in the memory. This enables the images to be played back as a movie to show the continuous motion of the objects in the played images. The term continuous is not being used to refer to an act that must be always on going, but rather refers to the continuous and sequential nature of how the images are processed and stored in a manner suitable for movie playback.

It is possible to omit the initial compression and simply transfer the raw data for each image to the FIFO buffer 16. Thus, the further compression would no longer need to be regarded as "further," as it is the first compression.

The FIFO buffer 16 is also coupled to the memory system 20 to enable, upon the occurrence of a predetermined condition, copying of the initially compressed digital data of the images in the buffer to the memory system 20 separate from the further compressed data. This allows the initially compressed digital data of the images copied from the buffer to be retrieved. It is these initially compressed images that may be used for still images, as they will have a higher resolution than those images subject to the further compressor 18.

The predetermined condition will typically be the actuation by the user of the camera of a button, switch, or any other actuation element, but may be some other trigger or event. Because of the lag time in reflexes between a human user seeing an image that he/she wants to capture in higher resolution, and actuating such an actuation element, the use of the buffer 16 accommodates this lag time. Specifically, the imaging device 12 may capture X images per second, with X being equal to any suitable number, and the FIFO buffer may be adapted to store N seconds of the images, with N being equal to any suitable number long enough to accommodate such user lag time. The buffer 16 in simple lay terms provides the initially compressed images with a "waiting area" prior to the final compression so that they are available for a short interval to be copied to the memory system 20 upon the actuation of the actuation element by the user.

As an option, upon the occurrence of the predetermined condition, the digital data of the images in the buffer 16 may be copied by:

a. copying the digital data for a first number of images to the memory system, the first number of images being present within the buffer at the occurrence of the predetermined condition, and b. copying the digital data for a second number of images to the memory system, the second number of images being stored to the buffer after the occurrence of the predetermined condition.

This allows the copied higher resolution images to include a first number of images that resided in the buffer 16 just prior to actuation by the user, and a second number of images that are newly captured by the imaging device 12 just after the actuation.

The number of frames or images before and after the actuation may optionally controlled by a user input. Such an input may be a dial, a slider, a tactically sensitive display, a keypad, or any other suitable user input. The information input by the user would be used to determine the first and second numbers of images to be copied, i.e., the numbers of images before and after the actuation. Of course, it may also be used to determine the number of pre-actuation images residing in the buffer 16 if the system 10 is not designed to copy the post-actuation images also. Likewise, the user input may be used to determine whether or not to include post-actuation images in the images being copied. The information input by the user may be the total number of frames to be copied. However, because people are more accustomed to thinking in terms of time rather than frame count, it is preferred that the user select the total amount of time over which the images are to be captured (e.g., 5 seconds, 10 seconds, or the ranges of seconds before and after the actuation, etc.). Preferably, the user would input both the lag time to be accommodated (which could be up to the entire buffer capacity), and the overall timeframe for copying the images. In such a case, to ensure that a user does not miss an opportunity to capture an image, and allow him or herself room for error, the user may decide that 2 seconds of lag time is sufficient for the user to make a decision and actuate the actuation element. The user may also select 4 seconds worth of image capture, meaning that 4 seconds of images would be copied to the memory system 20. With the 2 second lag time, the system 10 would copy the images that had been residing in the buffer 16 for 2 seconds or less prior to actuation, and then those that are transferred to the buffer 16 for the 2 seconds remaining after actuation. This information is preferably input and set before the user starts using the camera for filming, thus avoiding the delay of having to input the information before the images desired have exited the buffer 16.

To transfer the data for each initially compressed (or raw), higher resolution image from the FIFO buffer 16 to the memory, any technique may be used. For example, if the FIFO buffer 16 is an implemented buffer comprising a RAM with the microcontroller managing the data flow through the RAM, the microcontroller may seek the higher resolution image data from the appropriate locations in the RAM and transfer them to the memory for later retrieval. Likewise, if the FIFO buffer 16 is a physically separate buffer, such as a separate register, the microcontroller may transfer a copy of the appropriate image data files as they exit the buffer, but before they are further compressed. Any other suitable technique may be used, and these examples are not intended to be limiting. Also, it can be appreciated that the FIFO buffer 16 need not be a physically separate component, such as a register, and may instead be of the implemented type, or any other technique or componentry may be used for managing the data flow of the image data.

The memory system 20 is a generic term and it may comprise a single memory or a plurality of separate memories. Such memories refer to computer readable media, and may be of the type that are removable from the camera, or of the type that are integrated into the camera. Examples of such memory may include, but are not limited to flash memory, USB thumb drives, a memory stick, CDs, DVDs or other optical recording media, floppy disks or other magnetic recording media, or any other type of memory now known or later developed. Where the memory comprises a single memory, the further compressed digital data and the initially compressed digital data are stored separately in the memory. By being separate, they need not be physically separate, but are addressed such that the lower resolution images can be retrieved in sequence for playback of the movie comprising those images separately from the higher resolution images copied directly from the buffer 16, and vice versa. Likewise, the lower resolution images could be stored to a first memory and the higher resolution images could be stored to a physically separate second memory.

Figure 2:
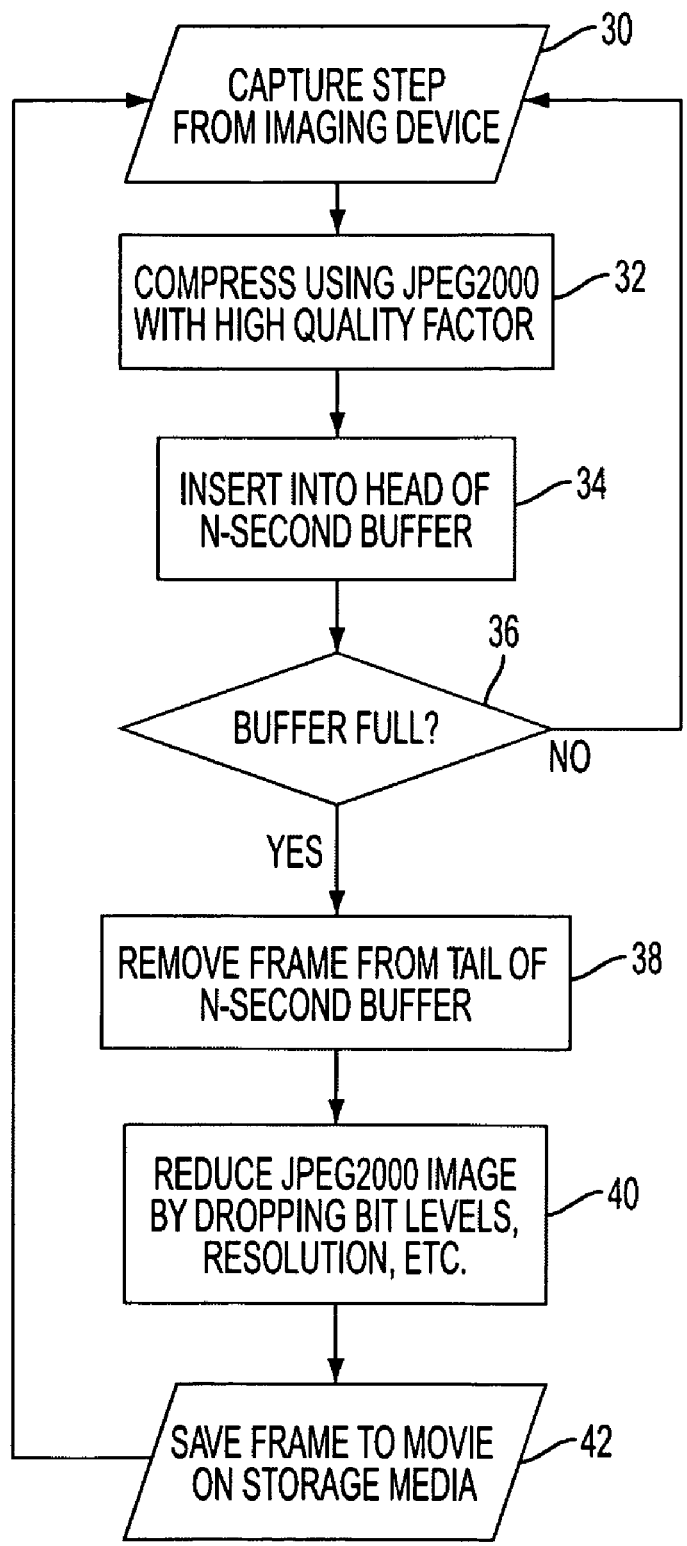
FIG. 2 is a flowchart showing an aspect of a methodology that may be used in the system of FIG. 1.
Figure 3:
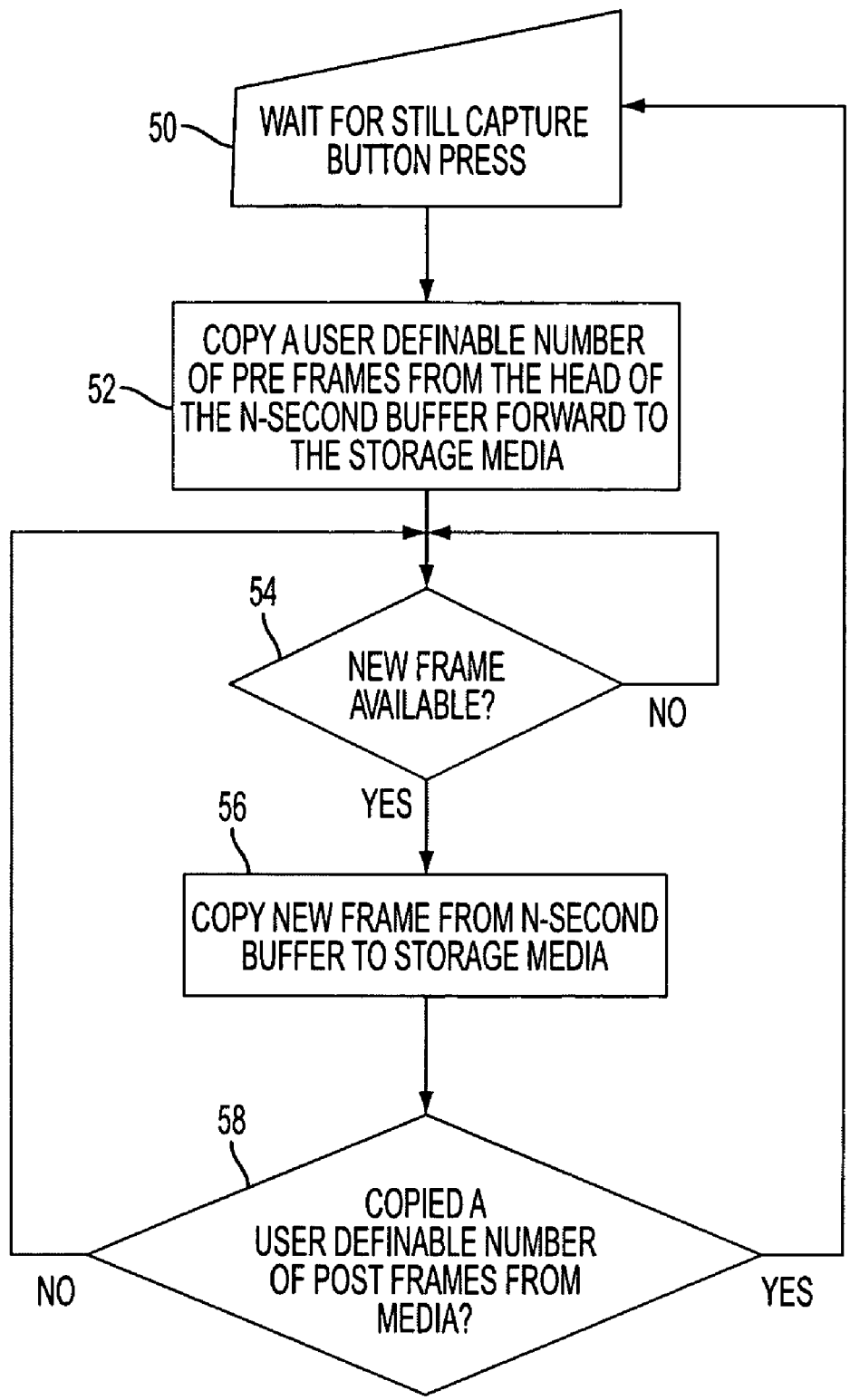
FIG. 3 is a flowchart showing another aspect of a methodology that may be used in the system of FIG. 3.

FIGS. 2 and 3 illustrate flowcharts of the methodology executed by the system 10. The various functions of the system elements may be controlled by a central microprocessor, and the instructions may be embedded in a chip, or may be loaded into a memory associated with the microprocessor as software. The particular manner in which the system elements are controlled and the method is performed is not particularly critical, and any control structure or architecture may be used for the system 10.

FIG. 2 illustrates the "movie" part of the system's operation. That is, it illustrates the method by which images are captured, compressed, and stored in sequence to the memory system 20 for later retrieval and playback. In block 30, the imaging device captures an image. This image may also be referred to as a frame, as has been done in the Figures, because the term refers to the individual frames of a classic cellulose movie film conventionally stored in a reel. Although that film has been replaced by images in the form of digital data, it is still commonplace for the term frame to be used in this context. In block 32, the captured frame or image is transferred to the initial compressor 16, and initially compressed using the JPEG 2000 protocol (or any other protocol) as described above. In block 34, the initially compressed image is transferred to the head of the buffer 16. In block 36, the system 10 queries whether the buffer 16 is full. If it is not, the method cycles back to block 30 and repeats blocks 30-34, adding frames/images to the buffer 16 in sequence until it is filled. This will only occur at the beginning of filming, as that is when the buffer 16 will be initially empty. Once the buffer 16 has been filled, it will remained filled because as each new image is added to the head of the buffer 16, a prior image will be exiting the tail of the buffer 16.

In block 38, the frame residing in the tail of the buffer 16 is removed, and transferred to the further compressor 18 at block 40. The further compressor 18 further compresses the image/frame in accordance with the JPEG 2000 protocol (or any other suitable protocol), as described above. This further compression drops the bit levels and resolution, etc. In block 42, the further compressed image/frame is stored to the memory system 20. This method is repeated continuously at a high speed, with each subsequent image being stored and addressed in sequence in the memory system 20 so that the images can be retrieved for playback in a movie format.

FIG. 3 illustrates the high resolution image capture aspect of the method. In block 50, the user has decided he/she has seen a scene or image that he/she wants to capture in high resolution, and presses the actuation element. Because a preferred use of these high resolution images is for use in generating a still image, the actuation element may be labeled with a term or nomenclature that denotes this purpose, such as a button labeled Still Capture. When this button is actuated, images/frames residing in the buffer 16 are copied to the memory system 20 in block 52. Specifically, the images/frames in the buffer 16 that range from the head to the register that holds the image/frame that was taken at the beginning of the defined lag time are copied to the memory system 20 as discussed above. Thus, if the lag time of images to be copied is 2 seconds, all the images from the buffer head to the register containing the image that was captured 2 seconds prior to actuation of the button would be copied.

If the system 10 is designed such that the user has defined a time frame (or a number of images) where images/frame that are captured after actuation are also to be copied to the memory system 20, then in block 54 the system queries whether a new image or frame is available. If it is not, the method loops back and re-queries until one is. When the new image is available, in block 56 it is copied to the memory system 20. In block 58, the system queries whether all the images/frames in the post-actuation range have been copied. If they have not, the method loops back to block 54. When those images/frames have been copied, this part of the method is complete, and the method loops back to block 50 and awaits the user to actuate the cycle again. These images are stored and addressed in sequence so that they may be retrieved or played back in order, and the user may use software to view the images on an image by image basis for selecting one or more high quality still images.

The described embodiment may also be used to capture groups of high resolution images (e.g., a scene) even when the full movie mode is not being used. Specifically, the camera could continuously run the images being captured through the buffer 16 similarly to the operation described above, and the user could depress the button to save the initially compressed or raw image data in the buffer 16 to the memory in the same manner as described above. This could be described as a Scene Capture Mode, which is a mode in the same camera system that is separate from the movie capture mode described above. The user could then keep the scene as is, or peruse the images for selecting one or more desired still images from the group. However, there would be no further compression and no further compressed images would be stored in the memory for the playback of a full movie.

The foregoing embodiments have been provided as examples within the scope of the invention and should not be regarded as limiting. To the contrary, the present invention is intended to encompass all modifications, substitutions, alterations, and equivalents within the spirit and scope of the following claims.

What is claimed:

1. A method for storing higher resolution images during capture and storage of a movie comprising lower resolution images, the method comprising:
    capturing a series of images in succession with an imaging device wherein each image is captured as digital data,
    continuously storing the digital data of the images in order in a FIFO buffer adapted to store a number of said images;
    continuously compressing with a compressor the digital data of each image exiting the buffer; and
    continuously storing the compressed digital data for each image in a memory system to enable the compressed digital data to be retrieved for playback of the images in a movie format; and
    upon the occurrence of a predetermined condition, copying the digital data of the images in the buffer to the memory system separate from the compressed data to enable the digital data of the images copied from the buffer to be retrieved.

2. A method according to claim 1, wherein the compressor is a further compressor, and wherein the method further comprises initially compressing with an initial compressor the digital data of each image being stored in the buffer, and wherein:
    the aforesaid compressing of the digital data of each image exiting the buffer is a further compressing by said further compressor;
    the compressed digital data continuously stored in the memory system is the further compressed digital data, and
    the digital data copied to the memory system is the digital data initially compressed by the initial compressor.

3. A method according to claim 2, wherein the memory system comprises a single memory, and wherein the further compressed digital data and the initially compressed digital data are stored separately in the memory.

4. A method according to claim 2, wherein the memory system comprises two memories, wherein the further compressed digital data is stored to a first of said two memories, and wherein the initially compressed data is stored in a second of said two memories.

5. A method according to claim 2, wherein the imaging device captures X images per second, and wherein the FIFO buffer is adapted to store N seconds of said images.

6. A method according to claim 2, wherein upon the occurrence of the predetermined condition, the digital data of the images in the buffer is copied by:
    (a) copying the digital data for a first number of images to the memory system, the first number of images being present within the buffer at the occurrence of the predetermined condition, and
    (b) copying the digital data for a second number of images to the memory system, the second number of images being stored to the buffer after the occurrence of the predetermined condition.

7. A method according to claim 6, wherein the first and second numbers of images are determined based on information input by a user.

8. A method according to claim 7, wherein the information input by the user is at least one of the group consisting of the total number of frames to be copied from the buffer, and the total amount of time over which images are captured.

9. A system for storing higher resolution images during capture and storage of a movie comprising lower resolution images, the system comprising:
    an imaging device operable to capture a series of images in succession wherein each image is captured as digital data,
    a FIFO buffer coupled to the imaging device for continuously storing the digital data of the images;
    a compressor coupled to the FIFO buffer, the compressor being operable to continuously compress the digital data of each image exiting the buffer; and
    a memory system coupled to the compressor, the memory system being adapted to continuously store the compressed digital data for each image to enable the compressed digital data to be retrieved for playback of the images in a movie format;
    wherein the FIFO buffer is also coupled to the memory system to enable, upon the occurrence of a predetermined condition, copying of the digital data of the images in the buffer to the memory system separate from the compressed data, thus allowing the digital data of the images copied from the bluffer to be retrieved.

10. A system according to claim 9, further comprising an initial compressor coupled between the imaging device and the buffer, the initial compressor being operable to initially compress the digital data of each image being stored to. the buffer, and wherein:
    the aforesaid compressor is operable to compress the digital data of each image exiting the buffer is a further compressor;
    the compressed digital data continuously stored in the memory system is the further compressed data, and
    the digital data copied to the memory system is the initially compressed digital data.

11. A system according to claim 10, wherein the memory system comprises a single memory.

12. A system according to claim 10, wherein the memory system comprises two memories, wherein the further compressor is coupled to a first of said two memories for enabling storage of the further compressed digital data to the first memory, and wherein the buffer is coupled to a second of said two memories for enabling storage of initially compressed digital data to the second memory.

13. A system according to claim 10, wherein the imaging device is adapted to capture X images per second, and wherein the FIFO buffer is adapted to store N seconds of said images.

14. A system according to claim 10, wherein the system is configured such that, upon the occurrence of the predetermined condition, the digital data of the images in the buffer is copied by:
  (a) copying the digital data for a first number of images to the memory system, the first number of images being present within the buffer at the occurrence of the predetermined condition, and
  (b) copying the digital data for a second number of images to the memory system, the second number of images being stored to the buffer after the occurrence of the predetermined condition.

15. A system according to claim 14, further comprising a user input for enabling a user to input information upon which the first and second numbers of images is determined.

16. A system according to claim 15, wherein the user input enable the user to select at least one of the group consisting of the total number of frames to be copied from the buffer, and the total amount of time over which images are captured.

17. A method for capturing and storing images, the method comprising:
  capturing a series of images in succession with an imaging device wherein each image is captured as digital data,
  continuously storing the digital data of the images in order in a FIFO buffer adapted to store a number of said images;
  upon the occurrence of a predetermined condition, copying the digital data of the images in the buffer to a memory system to enable the digital data of the images copied from the buffer to be retrieved.

18. A method according to claim 17, wherein the imaging device captures X images per second, and wherein the FIFO buffer is adapted to store N seconds of said images.

19. A method according to claim 17, wherein upon the occurrence of the predetermined condition, the digital data of the images in the buffer is copied by:
  (a) copying the digital data for a first number of images to the memory system, the first number of images being present within the buffer at the occurrence of the predetermined condition, and
  (b) copying the digital data for a second number of images to the memory system, the second number of images being stored to the buffer after the occurrence of the predetermined condition.

20. A method according to claim 19, wherein the first and second numbers of images are determined based on information input by a user.

* * * * *